U. PAVESI & G. TOLOTTI.
MOTOR PLOW.
APPLICATION FILED JAN. 23, 1912.

1,169,564.

Patented Jan. 25, 1916.
4 SHEETS—SHEET 1.

WITNESSES:

INVENTORS:
Ugo Pavesi
Giulio Tolotti
By their Attorney
P. Singer

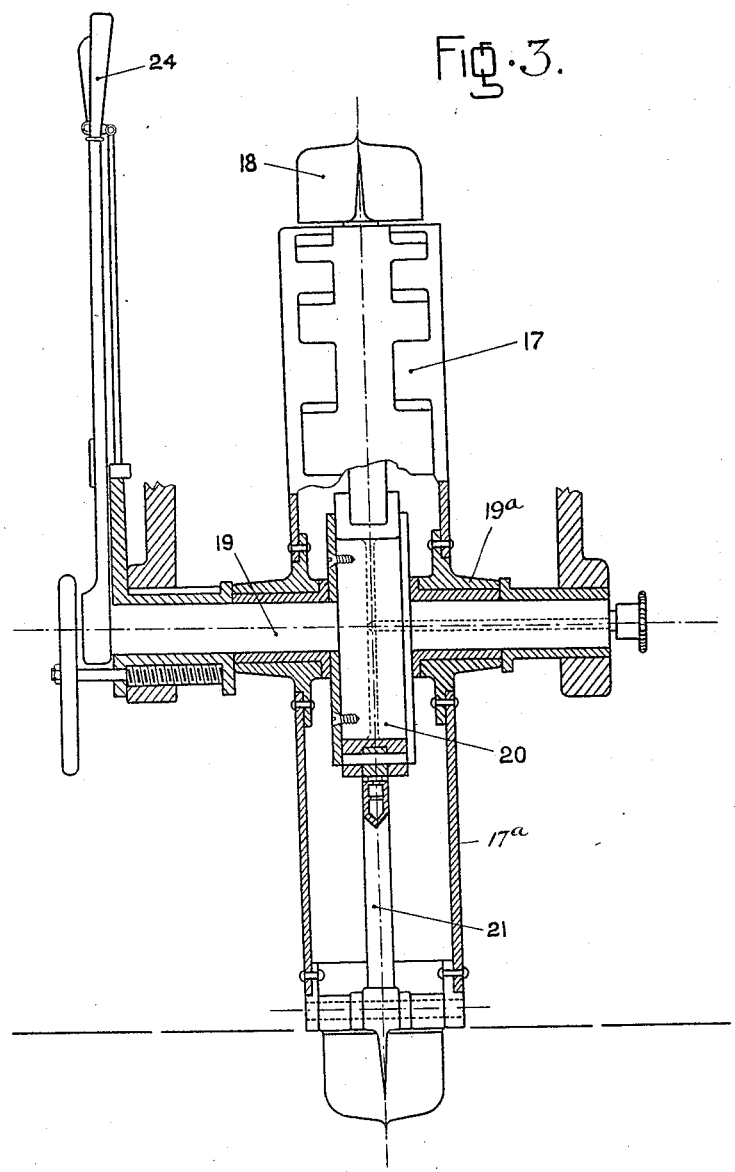

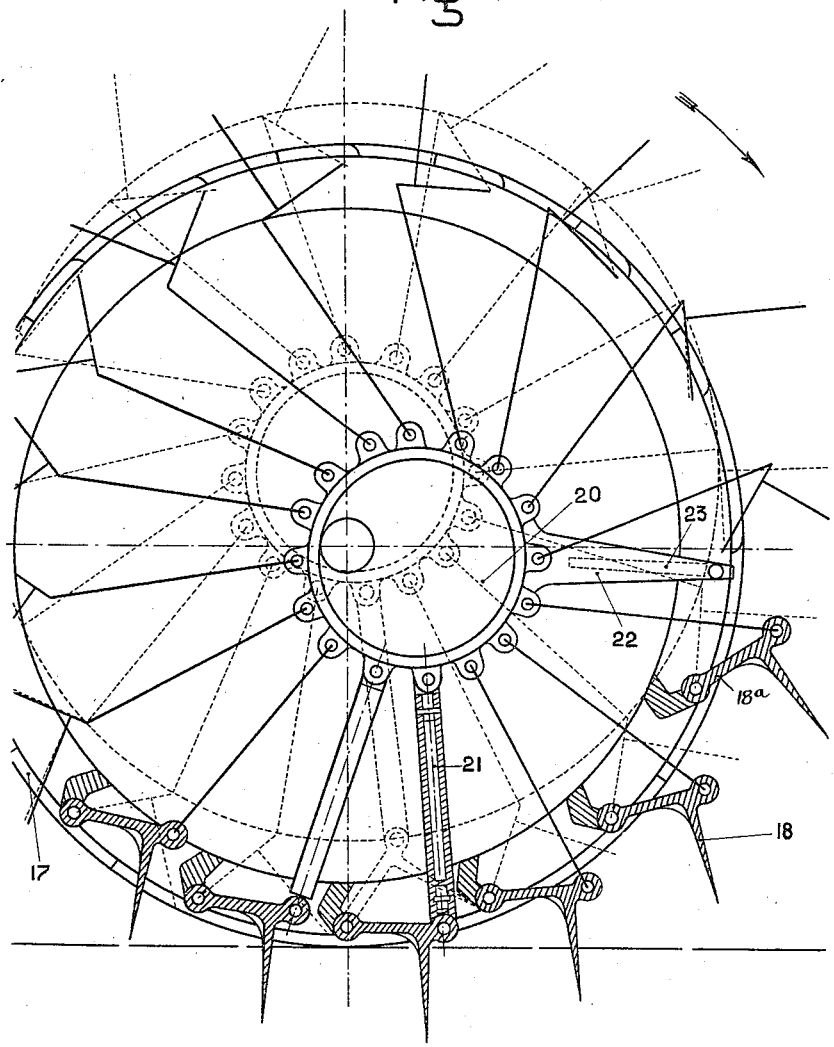

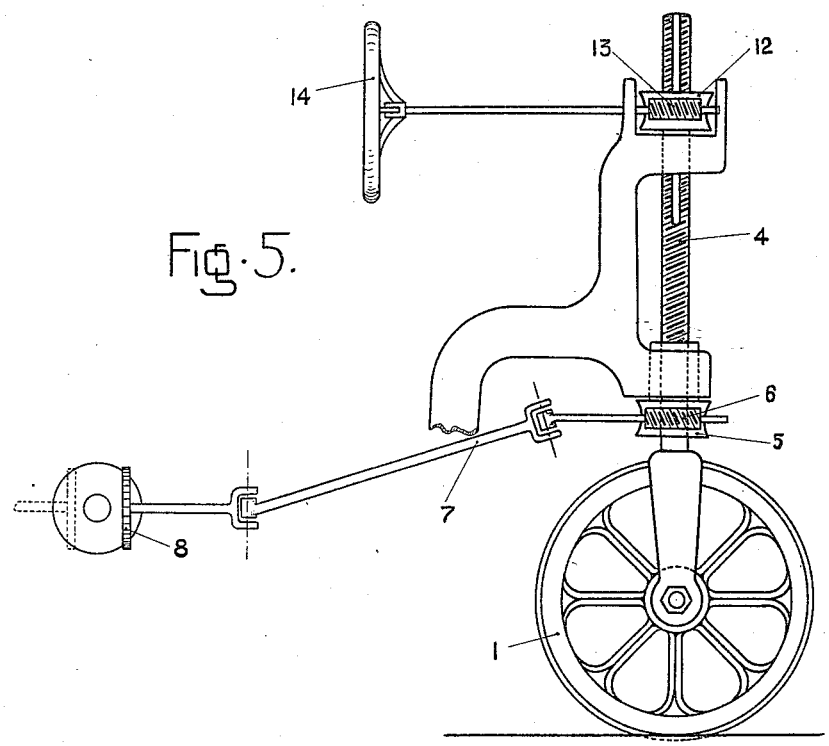

UNITED STATES PATENT OFFICE.

UGO PAVESI AND GIULIO TOLOTTI, OF TURIN, ITALY, ASSIGNORS, BY MESNE ASSIGNMENTS, TO A. M. LEONI MANUFACTURING COMPANY, OF PHILADELPHIA, PENNSYLVANIA, A CORPORATION OF DELAWARE.

MOTOR-PLOW.

1,169,564.  Specification of Letters Patent.  Patented Jan. 25, 1916.

Application filed January 23, 1912. Serial No. 672,968.

*To all whom it may concern:*

Be it known that we, UGO PAVESI and GIULIO TOLOTTI, subjects of the King of Italy, both residing at Turin, Italy, have invented certain new and useful Improvements in and Relating to Motor-Plows, of which the following is a full, clear, and exact specification.

This invention relates to motor driven machines such as are used for plowing purposes. Such plows usually embody one or more traction wheels which grip the ground and produce the traction effect for forcing the plow shares through the soil. As the resistance of the earth to the plow is very high, a very high tractive effect is required. Ordinarily, this would necessitate a great weight on the traction wheel to prevent slipping and this would in turn necessitate a heavy weight plow and relatively high horse-power for the motor. By our invention we improve the tractive effect of the wheel and, at the same time, make it so that its efficiency is not directly dependent upon great weight being placed upon it. In this way we are enabled to make the plow and motor lighter and thus reduce the original cost of the plow and also the cost of operation.

A principal object of our invention is to effect these results while improving the tractive effect of the traction wheel.

The invention consists in the general combination and arrangement of parts hereinafter described, all of which contribute to produce an efficient device.

A preferred embodiment of our invention will be particularly described in the following specification, while the broad scope of our invention will be pointed out in the appended claims.

Figure 2:
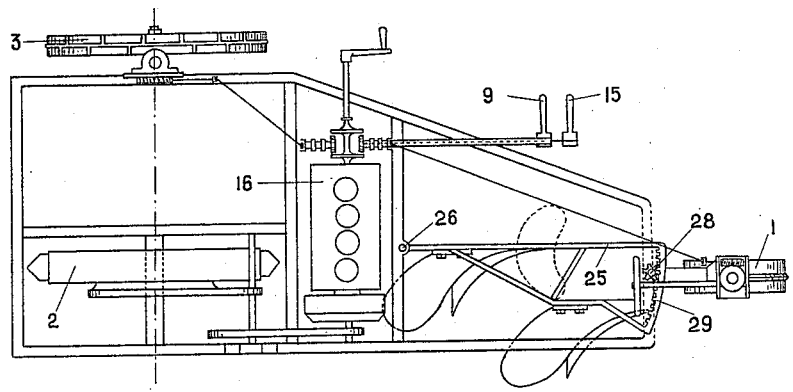
Figure 1:
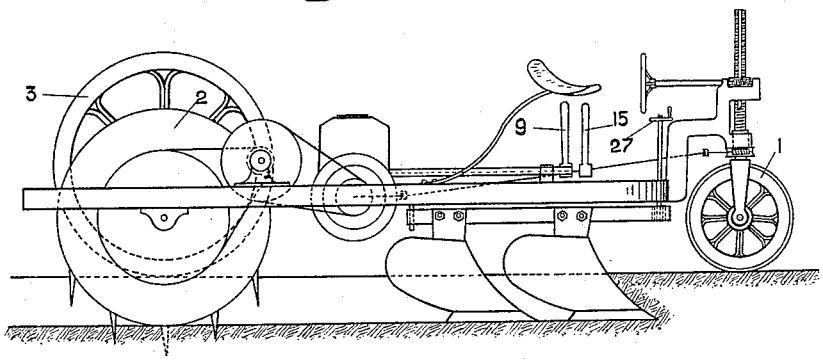

In the drawings, Figure 1 is a side elevation of a plow embodying our invention. Fig. 2 is a plan of the plow illustrated in Fig. 1. Fig. 3 is a front elevation of the traction wheel, a portion of which is shown in cross section, together with continuous parts. Fig. 4 is a side elevation partly diagrammatic and illustrating the preferred form of the traction wheel which is illustrated in Fig. 3. Fig. 5 is a side elevation, partly broken away, illustrating the mechanism for effecting the adjustment of the depth of the furrow and also the steering mechanism.

In the preferred form of the invention, the frame rests on three wheels 1, 2 and 3, of which 1 is the steering wheel, 2 the driving wheel, while wheel 3 serves only as a guiding wheel. The wheel 2 runs in the furrow made in the earth by one of the shares while the wheels 1 and 3 always run on the surface of the ground. By this means the advantage is attained that the wheels never run on the tilled ground. The wheel 1 may serve to determine the depth of the furrow and may be adjusted by means of the screw 4 and wheels 5, a second screw 6, the shaft 7 and the friction clutch 8. This clutch is able to rotate in either direction when pressed by the lever 9 against one or the other of the friction disks 10 and 11 driven by the motor. The wheel 1 serves as the steering wheel for the plow and is adjustable by means of the worm wheel 12, the worm 13 and the hand wheel 14. The wheel 3 is preferably adjustable by the lever 15 (Figs. 1 and 2) so as to coöperate with wheel 1 to hold the plow frame upright. The driving wheel 2 is preferably driven by the motor 16 through sprocket wheels $2^a$ and chains $2^b$ or an appropriate gear wheel transmission, which should be reversible.

The tractive effect of wheel 2 produces the movement of the plow and to this end this wheel comprises a hub $19^a$ mounted on some suitable shaft or axle 19. The rim 17 of this wheel is connected to the hub in any suitable manner, as for example by spokes or by side plates or frames such as indicated at $17^a$. Pivotally mounted on the rim 17 between the side plates or frames $17^a$ are the levers $18^a$ which as shown have spade-like extensions or tractor blades 18 formed integral therewith and substantially perpendicular thereto. These levers and blades are preferably of substantially the same width as the distance between the side frames of the wheel, and the blades are preferably provided with relatively sharp cutting edges, so that they may penetrate the earth to a depth substantially equal to their length. The tractor blades therefore do not displace the soil to any appreciable extent and act merely as a cutting tool in penetrating the earth. Thus they retain their maximum efficiency as tractors and tend to keep the driving wheel at a substantially uniform level, since they do not displace the earth and moist soil is unlikely to cling to them. As the wheel rotates these tractors 18 penetrate into the earth and give the plow a good hold on the ground; and they are arranged in such a way that they exert a rearward pressure on the ground behind them without tending to dig it up and loosen it. In order to accomplish this, we mount the tractors so that they virtually stand still when in contact with the ground except for the entering and withdrawing movement; that is each tractor penetrates the ground by a substantially straight downward thrust in its own plane. This effect is preferably accomplished by means of an eccentric 20 fixed on shaft 19 which is held in the frame fixed, relatively to the wheel, and carries a loose eccentric strap 20ª which imparts movement to a plurality of rods or links 2ᴸ which are attached respectively to the tractors. These are movably mounted on the wheel and are preferably pivoted to the wheel rim so that they can be swung in or out of the links 21.

When the wheel 2 rotates the tractors assume different positions (Fig. 4) and are moved by the links in such a manner that the rotation which they have on account of the movement of the wheel, is compensated for by gradually swinging the tractors on their pivots, and in this way instead of inclining toward the front or rear near the ground, they are made to move down in a substantially fixed plane and penetrate to a depth in the earth at their lower or cutting edges; and furthermore, while inserted or withdrawing from the ground, they are maintained substantially vertical, and do not tilt or move so as to disturb the earth behind them. The tractors also leave the ground by a substantially vertical movement, that is, they maintain themselves in a substantially fixed plane of movement. By this means an additional advantage is attained, consisting in this, that as these members do not have any positive movement in a front or rear direction when in the ground, no useless work is performed, and a very economic as well as a very efficient tractive effect results.

The eccentric strap 20ª rotates with the wheel, being guided in a slot 23 in the wheel by means of a pin 22ª on an arm 22.

If the wheel 2 is to be used as an ordinary road wheel, the members 18 are brought into the position indicated in broken lines by means of a handle 24, which adjusts the shaft 19 to a new position which draws in the tractors 18 at the underside of the wheel.

The driving wheel is adjustable on its shaft according to the work of the shares so that the middle planes of the wheel can always be set in the middle of the resistance of the plow. (Fig. 3.)

The implements serving for working the ground, which may be of the ordinary construction, are secured to a second horizontally adjustable frame 25. As shown in Fig. 2, the adjustment of this frame around a point 26 is effected by means of a lever 27, a gear wheel 28 and a rack 29. The direction in which the plow or the shares operate can be altered and the furrows formed may be either straight or curved.

We consider that a traction wheel secures tractive effect as described, or more efficient than wheels for this purpose which merely engage the upper surface of the ground. And such a wheel as we disclose is particularly effective when running in a furrow because the tractors are operating to a greater depth in the earth and where the earth is denser and more resistant.

It is understood that the embodiment of the invention described above is only one of the many embodiments or forms the invention may take, and we do not wish to be limited in the practice of the invention nor in the claims to the particular embodiment set forth.

Having thus described our invention, what we claim is:—

1. In a traction wheel, the combination of an axle, a hub mounted thereon, a rim, members rigidly connecting the hub and rim, a plurality of levers pivotally mounted on said rim, a sharpened blade integral with and substantially perpendicular to each of said levers, an eccentric mounted on the axle, a strap encircling the eccentric and links connecting the levers to the strap, whereby the successive blades normally enter and leave the ground in a substantially vertical plane.

2. In a traction wheel, the combination of an axle, a hub mounted thereon, a rim, members rigidly connecting the hub and rim, a plurality of levers pivotally mounted on said rim, a sharpened blade integral with and substantially perpendicular to each of said levers, an eccentric mounted on the axle, a strap encircling the eccentric and provided with an arm operatively connected with the rim to cause the strap and rim to rotate together and links connecting the levers to the strap, whereby the successive blades normally enter the ground in a substantially vertical plane.

In witness whereof we have hereunto signed our names in the presence of two subscribing witnesses.

UGO PAVESI.
GIULIO TOLOTTI.

Witnesses:
   PIERO GIAEROLIO,
   GIULIO BARZETTO.

Copies of this patent may be obtained for five cents each, by addressing the "Commissioner of Patents, Washington, D. C."